March 11, 1941.   H. HARTMANN   2,234,898
METAL MELTING METHOD AND APPARATUS
Filed Oct. 31, 1940
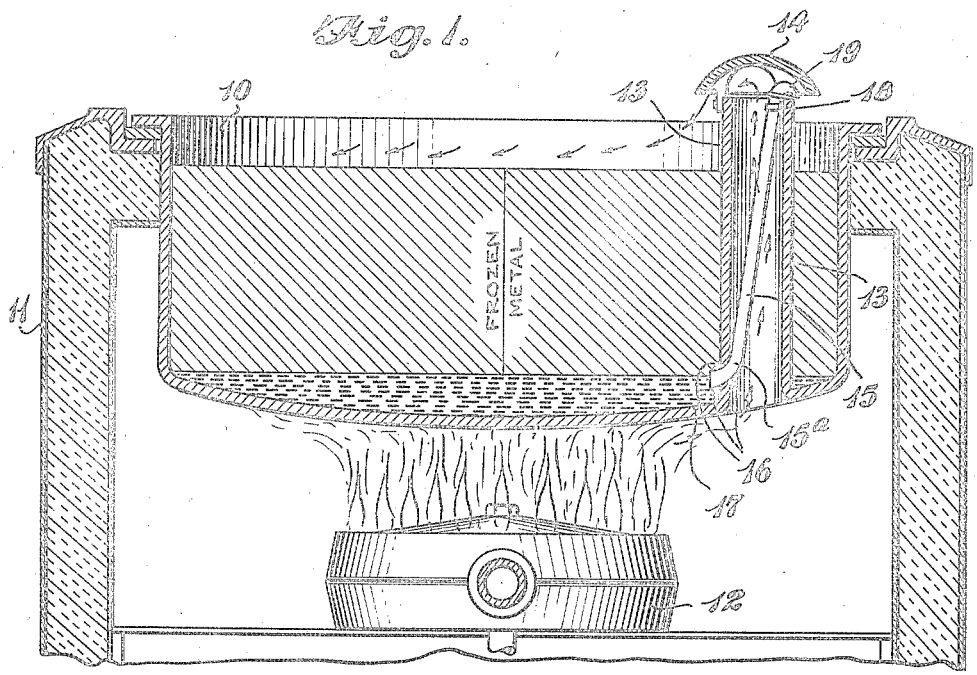
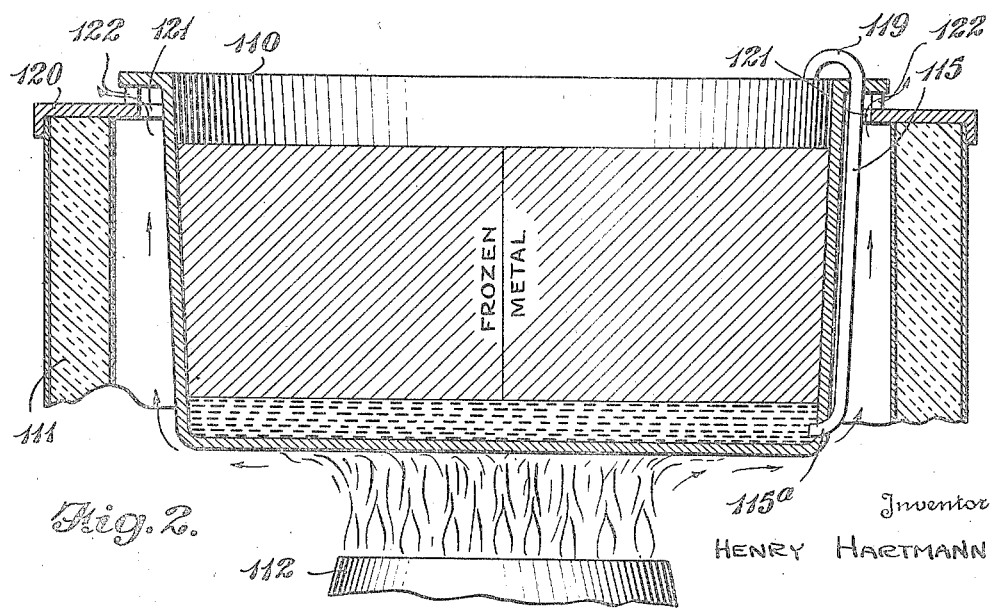
Inventor
HENRY HARTMANN
By KARL W. FLOCKS
Attorney Patented Mar. 11, 1941

2,234,898

UNITED STATES PATENT OFFICE 2,234,898

METAL MELTING METHOD AND APPARATUS

Henry Hartmann, Brooklyn, N. Y., assignor to United American Metals Corporation, Brooklyn, N. Y., a corporation of New York Application October 31, 1940, Serial No. 363,786

5 Claims. (Cl. 266—33)

This invention relates to the melting of metal, and more particularly to a pressure relief system for the relief of excessive pressures caused by the non-uniform heating of frozen metal in a melting pot.

Prior to the instant invention, it has been customary to melt or remelt metal such as type metal, white metal, solder and other metals and alloys in a furnace having a pot which may be made of cast iron or steel, which pot is heated by a heating means located therebeneath. The heating means may be a gas heater or an electric heater. In such installations, when shutting the furnace down at the end of the day's work or for any other reason, the molten metal within the pot will freeze into a solid mass. When the furnace is again placed in action with the heating means operative and located either beneath or in the bottom of the pot, the frozen solid mass of metal will melt in the bottom of the pot adjacent the heater and this molten metal will tend to expand and create a dangerously excessive pressure which must find relief or crack the pot. In those pots which have bottom-pour valves, the molten metal under this excessive pressure will find its way past the valve even though the valve is tightly fitted.

It has been proposed that the heating be applied to the frozen mass in a more uniform manner by arranging fire tubes in the melting pot at frequent intervals throughout the horizontal section thereof and extending upwardly to the top of the pot. Such prior constructions have been relatively expensive to manufacture, have been subject to frequent damage by the striking of the fire tubes by heavy pieces of metal to be melted, and generally must be of relatively great size to accommodate a given mass of metal because of the space occupied by the upwardly extending fire tubes.

It is an object of the instant invention to provide a novel metal melting system which will facilitate the remelting of a frozen mass of metal in a melting pot and prevent injury to the pot due to the expansion of the metal which is first melted.

It is a further object of the instant invention to provide a novel pressure relief system for the relief of excessive pressures in a melting pot which is simple in nature and foolproof.

It is another object of the instant invention to provide a melting pot with an excessive pressure relief device incorporated therein which is inexpensive to manufacture, occupies a minimum of space and is dependable.

With these and other objects in view, the embodiments of the invention are described in the following specification and claims and illustrated in the accompanying drawing, in which:

Figure 1 is a vertical section of a portion of a furnace including a melting pot incorporating a pressure relief system in accordance with the invention; and Figure 2 is a view similar to Figure 1 but of a modified form of the invention.

Referring to Figure 1, the pot 10 is supported on the walls of the furnace 11 directly above the gas burner 12. Formed in the pot 10 and extending from the bottom thereof to a height just above the top thereof is the muffler tube 13 which acts as a fire tube and serves to conduct the hot gases upwardly therethrough to the under side of the deflector 14 which is mounted thereon. The deflected hot gases then find their way over the top of the metal within the pot as shown by the arrows.

In order to provide a molten metal passageway from the bottom of the pot to the top thereof, the tube 15 formed with a curved portion 15a at its lower end is welded at 16 to the wall of the muffler tube 13 adjacent the bottom thereof. The tube 15 is preferably of a heat resisting alloy and may be of stainless steel. The bottom 15a of the stainless steel tube 15 is arcuate in shape and extends through the wall of the muffler tube 13 for a short distance and the construction is such that the very bottom of the tube 15 is spaced about one-quarter of an inch from the bottom 17 of the melting pot 10 in order to facilitate welding.

The tube 15 may be secured adjacent its top to an opposite wall of the muffler tube 13 by the collar 18, and the top of the tube 15 may be provided with a U-shaped fitting 19 for directing the metal first to be melted back into the pot.

In operation, assuming the metal within the pot 10 is frozen solid, and the burner 12 has just been started, the metal in the lower part of the pot 10 and the metal within the heat resisting tube 15 will first begin to melt, for both the bottom of the pot and the heat resisting tube 15 are more or less first directly subjected to the heating action of the hot gases emanating from the heater 12. After the metal in the bottom of the melting pot has become molten, the pressure therein may become very great unless it is relieved in some manner, and in accordance with the invention, the expanding hot metal first melted may pass upwardly through the tube 15, through the U- shaped fitting 19 and back into the melting pot, thereby relieving the pressure within the pot and preventing injury thereto.

Should the interior of the bottom of the pot 10 be more concave than illustrated in Figure 1, the curved portion 15a of the heat resisting tube 15 may extend through the wall of the muffler tube 13 for a greater distance toward the center of the pot 10.

Referring to Figure 2, the pot 110 is formed with a flat bottom and supported on the furnace wall 111 over the burner 112 by the kettle ring 120 formed with openings 121 and 122 which occur at regular spaced intervals about the inner periphery thereof, the openings 121 being in a horizontal plane and the openings 122 being in a vertical plane. With this construction, hot gases from the burner 112, pass across the bottom of the kettle or pot 110, upwardly along the sides thereof and then out through the openings 121 and 122 in the kettle ring. Within the path of hot gases along the side of the kettle and spaced from the side wall thereof is the relief passage means 115 communicating with the interior of the pot adjacent its bottom at 115a. The passage means 115 may take the form of a tube formed at its top with a U-shaped portion 119 to conduct molten metal passing therethrough back into the melting pot 110.

In operation, the metal first melted within the melting pot is passed upwardly through the preheated relief passage 115 which is located within the hot gas path and returned to the melting pot as shown in the drawing, thereby relieving the pressure within the pot and preventing injury thereto.

It is to be understood that it is within the scope of the invention to substitute electric heaters for the burners 12 and 112 and also to locate the heaters directly within the melting pot when desired. Should the heaters be located directly within the melting pot, the relief passages provided by the conduits 15 and 115 should have their lower portion extending into the melting pot to a point adjacent the heating means. While the muffler tube 13 in Figure 1 is located to one side of the center of the pot 10, it is to be understood that it may be more centrally, or centrally, located without departing from the spirit of the invention.

It will be obvious to those skilled in the art that various changes may be made in this device without departing from the spirit of the invention and therefore the invention is not limited to what is shown in the drawing and described in the specification but only as indicated in the appended claims.

What is claimed is:

1. The method of melting a mass of solid frozen metal in a melting pot comprising applying heat to a portion of the pot to first melt a first part of the metal therein, heating a molten metal passage leading from said first melted metal part and in non-heat conducting relation with the unmelted second part of the metal, whereby the first melted part may expand and be relieved, and passing said first melted expanded part into direct contact with the exterior of the second unmelted part.

2. A metal melting furnace comprising a metal melting pot, heating means associated therewith to melt the metal therein, hot gas passage means leading from said heating means, molten metal relief passage means leading from within said melting pot adjacent the place first receiving heat from said heating means and extending through said hot gas passage means and back toward and in discharging relation to the interior of said pot.

3. The structure recited in claim 2, said heat resisting conduit being formed of stainless steel.

4. A metal melting furnace comprising a melting pot, heating means therefor, a fire tube extending upwardly and in heat exchange relation with said pot, a relief conduit extending through said fire tube with the bottom thereof adjacent the bottom of said pot, said heating means being located directly below said pot whereby the metal first to be melted may be passed upwardly through said relief conduit.

5. A metal melting furnace comprising a melting pot, a heating means disposed therebelow and a hot gas passage extending up one side of said pot, a relief conduit leading from the interior of the bottom of said pot and extending upwardly through said hot gas passage and back toward and in discharging relation to the interior of said pot.

HENRY HARTMANN.